May 19, 1936.  E. E. EMONS  2,041,638
SPECTACLE FRAME
Filed June 14, 1929
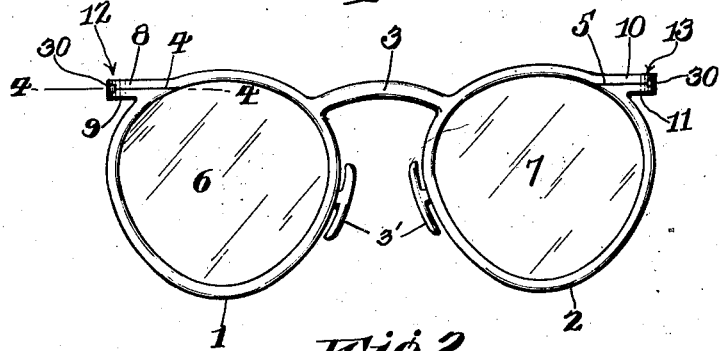
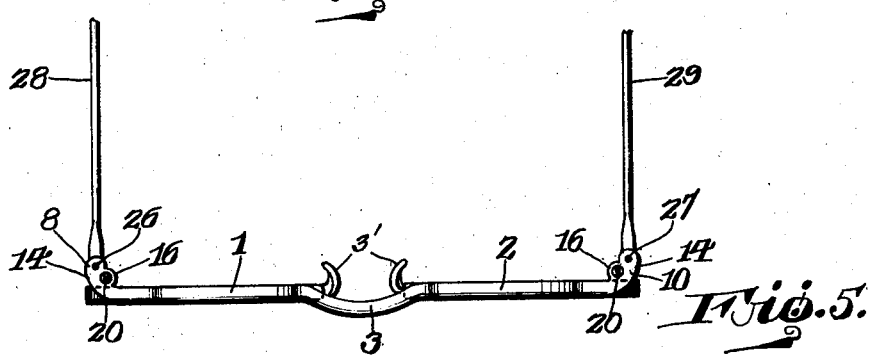
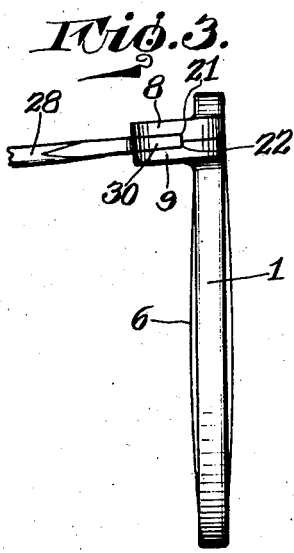
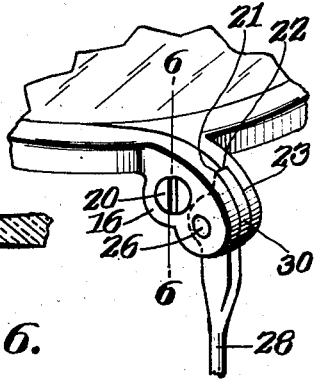
INVENTOR.
Ernest E. Emons,
BY
Geo. P. Kimmel
ATTORNEY.

Patented May 19, 1936

2,041,638

UNITED STATES PATENT OFFICE 2,041,638

SPECTACLE FRAMES

Ernest E. Emons, Akron, Ohio, assignor to The Ful-Vue Sales Company, Washington, D. C.

Application June 14, 1929, Serial No. 370,885

3 Claims. (Cl. 88—47)

This invention relates to spectacles of that type including end pieces disposed above the normal useful field of vision, and is an improvement upon the frame construction as disclosed by Letters Patent No. 1,685,192, granted to me September 25, 1928.

A further object of the invention is to provide, a pair of spectacles having in combination with a pair of rims for holding lenses, temples connected with means for holding lenses, temples connected with the lenses above the normal useful field of side vision through the latter, and extending rearwardly at the sides of the head of the wearer, and inclined downwardly with respect to the plane of the lenses when the spectacles are worn, a bridge member above the horizontal median of the lenses, and nose guards on the nasal sides of said lenses extending rearwardly of the plane of the lenses and having a part of their bearing surfaces, when the spectacles are worn, normally below the center of vision through the lenses and adapted to bear on the sides of the nose for carrying the weight of the spectacles on the nose and to act as a fulcrum support therefor when the spectacles are worn.

Further objects of the invention are to provide, in a manner as hereinafter set forth, a spectacle frame which is simple in its construction and arrangement, strong, durable, thoroughly efficient in its use, permitting of expeditiously securing the lenses to the frame, readily assembled, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawing wherein like reference characters denote corresponding parts throughout the several views:

Figure 1 is a front elevation of a spectacle frame in accordance with this invention and further illustrating the rims of the frame in encompassing position with respect to the lenses of the spectacles.

Figure 2 is a top plan view of a spectacle frame in accordance with this invention and further illustrating the temple bars connected therewith.

Figure 3 is a fragmentary view looking towards an end edge of the frame and upon an enlarged scale.

Figure 4 is a fragmentary view in sectional plan.

Figure 5 is a fragmentary view in perspective of the frame and upon an enlarged scale.

Figure 6 is a section on line 6—6 Figure 5.

The frame can be constructed of any suitable material, preferably metal. The frame includes a pair of rims 1, 2 of any suitable contour which are connected together by a bridge piece 3. On the inner sides of the rims and at a point a substantial distance below the bridge piece 3 an offset nose guard 3' is arranged, and which is so disposed as to extend inwardly beyond the rear face of the frame. The nose guard 3' is of a shape to prevent any inconvenience to the wearer when the spectacles are worn.

The outer side of each rim is split and the split in rim 1 is indicated at 4 and the split in rim 2 is indicated at 5. The splits are tangentially disposed with respect to the rims, are positioned above the centers of the pupils of the eyes when the spectacles are worn, preferably arranged at the top of the temple sides of the rims and permit of the rims being opened for the purpose of surrounding the edges of the lenses 6, 7 whereby when the rims are closed and retained in such position in the manner as hereinafter set forth the lenses 6, 7 will be secured to the frame. Preferably the splits will be located as shown and which is that each split is formed on the outer end portion of the top part of a rim at a point above the point of mergence of said outer portion in the upper portion of the outer side part of the rim. The split is positioned above and parallel to the horizontal median of the rim. Each split is formed in the outer portion of the upper part of the rim and at a point above the point of mergence of said outer portion with the upper portion of the outer side part of the rim. The splits are arranged above the nose guard 3'.

The rim 1 is formed with an end piece consisting of upper and lower sections 8, 9 respectively, the former being of greater length than the latter. The rim 2 is formed with a sectional end piece consisting of an upper section 10 and a lower section 11, the former being of greater length than the latter. The end piece which is provided on rim 1 is generally indicated at 12 and the end piece formed on rim 2 is generally indicated at 13. The end pieces 12, 13 are of like construction and extend downwardly throughout at a slight inclination from their inner towards their outer ends and curve rearwardly with respect to the outer portions of the top parts of the rims, but are oppositely disposed with respect to each other.

The inner faces of the sections 8, 9 form continuations of the walls of the split 4. The inner faces of the sections 10, 11 form continuations of the walls of the split 5.

Each upper section of each end piece has its outer portion directed rearwardly as indicated at 14. Each lower section of each end piece has its outer portion directed rearwardly as indicated at 15. Each upper section of each end piece has a lateral offset portion 16 and each lower section of each end piece has a lateral offset portion indicated at 17. The lateral offset portion 16 of an upper section is flush with the lateral offset portion of a lower section. The lateral offset portion 16 of each upper section is formed with an opening 18 having a threaded wall. The lateral offset portion of each lower section is provided with an opening 19 having a threaded wall. The opening 18 in an upper section registers with an opening 19 of a lower section. Threadedly engaging with the walls of a pair of registering openings is a clamping screw 20 for maintaining the split rim in closed position and in clamping engagement with the edge of a lens. The screw 20 is flush at one end with the outer face of an upper section and at its other end with the outer face of a lower section. See Figure 6.

The inner face of each upper section at the outer portion thereof is cut away to form a shoulder 21. The inner face of each lower section at its outer portion is cut away to provide a shoulder 22. When an upper section is associated with a lower section, the shoulders 21, 22 register and the opposed inner faces of said sections are spaced from each other to provide a clearance 23. The shoulder 21, as well as the shoulder 22 is in the shape as shown in Figure 4 and each shoulder has a concaved portion 24 and a beveled portion 25. The beveled portions of the shoulders provide stops and the concaved portions of the shoulders form a clearance for the outer ends of the temple bars and in this connection see Figure 4. The rim splits are parallel to the outline of the end piece to which they extend.

Fixedly secured in the outer ends of said end pieces are the pivots 26, 27 for the temple bars 28, 29 respectively.

The outer portion of each temple bar is indicated at 30 and is formed with an opening 31 for the passage of a pivot. The outer portion 30 of each temple bar is mounted in a clearance 23. The outer end of each temple bar is provided with a nose 32 which engages the inclined parts 25 of a pair of registering shoulders to limit the outward swing of the temple bars. The outer end of each temple bar has a curved edge 33 which opposes a pair of registering concave portions.

The rims are first clamped in position around the lenses, after which the temple bars are pivotally connected to the end pieces. The split rims provide for the expeditious mounting of the lenses therein, or in other words, enable the quick connecting of the lenses to the frame and overcomes the necessity of expanding and contracting a non-split rim for the purpose of properly engaging the lens to couple it to the frame. The rims can be quickly spread apart to receive the lenses and after which the sections of the end pieces are brought into abutting engagement and the clamping screws 20 mounted in position, and which clamps the rims tightly against the lenses and securely hold these latter.

It is thought the many advantages of a spectacle frame, in accordance with this invention and for the purpose set forth can be readily understood, and although the preferred embodiment of the invention is as illustrated and described, yet it is to be understood that changes in the details of construction can be had which fall within the scope of the invention as claimed.

What I claim is:

1. In spectacles and the like in combination with means for holding the lenses, temples connected to the temporal sides of the lenses above the center line of vision thereof and extending rearwardly and inclined downwardly and adapted to bear on the sides of the head to hold the spectacle in place on the nose, a bridge member for connecting the lenses and having a transverse portion substantially in line with the temple connections and for spanning the nose, and nose guards on the nasal sides of said lenses placed to the rear of the plane of the lenses and having the center portion of their bearing surfaces normally below the center line of vision of the lenses and adapted to bear on the sides of the nose to carry the weight of the spectacle on the nose and to act as a fulcrum support therefor.

2. In a pair of spectacles, means for holding lenses, temples connected with the lens holding means by temple connections above the horizontal medians of the lenses outside the useful field of side vision, said temple connections downwardly inclined with respect to the plane of the lenses, nose guards connected with the lens holding means and to normally bear on the sides of the nose below the center line of vision and rearwardly offset with respect to the plane of the lenses, and a bridge member for spanning the nose positioned above the center line of vision whereby the relationship of the positions of the lenses, temples, bridge and nose guards coact to balance the spectacles and lock them in place in the position set on the wearer.

3. In spectacles and the like in combination with means for holding lenses, temples connected with the temporal sides of the lenses above the normal useful field of side vision through the latter, and extending rearwardly at the sides of the head of the wearer, and inclined downwardly with respect to the plane of the lenses when the spectacles are worn, a bridge member spanning the nose positioned above the horizontal median of the lenses, and nose guards on the nasal sides of said lenses extending rearwardly of the plane of the lenses and having a central part of their bearing surfaces, when the spectacles are worn, normally below the center line of vision through the lenses and adapted to bear on the sides of the nose for carrying the weight of the spectacles on the nose and to act as a fulcrum support therefor when the spectacles are worn.

ERNEST E. EMONS.